United States Patent [19]
Hillburn

[11] Patent Number: 4,649,734
[45] Date of Patent: Mar. 17, 1987

[54] APPARATUS AND METHOD FOR CALIBRATING A FLOW METER

[75] Inventor: Thell L. Hillburn, Bartlesville, Okla.

[73] Assignee: Phillips Petroleum Company, Bartlesville, Okla.

[21] Appl. No.: 805,687

[22] Filed: Dec. 6, 1985

[51] Int. Cl.$^4$ .............................................. G01F 25/00
[52] U.S. Cl. ......................................................... 73/3
[58] Field of Search .............................................. 73/3

[56] References Cited

U.S. PATENT DOCUMENTS

| | | | |
|---|---|---|---|
| 2,958,218 | 11/1960 | Hill | 73/3 |
| 3,028,744 | 4/1962 | Bagwell et al. | 73/3 |
| 3,177,699 | 4/1965 | Lindquist et al. | 73/3 |
| 3,673,851 | 7/1972 | Wright et al. | 73/3 |
| 3,940,971 | 2/1976 | Krause et al. | 73/3 |
| 4,073,304 | 2/1978 | Lerner et al. | 137/101.21 |
| 4,307,601 | 12/1981 | Jackson | 73/3 |
| 4,372,147 | 2/1983 | Waugh et al. | 73/3 |

OTHER PUBLICATIONS

Brooks Technical Bulletin, "Meter Proving with the Brooks Compact Prover TM ", Brooks Instrument Division Emerson Electric Co. of Statesboro, Ga., published Aug., 1982, pp. 1–7.

*Primary Examiner*—Michael J. Tokar
*Assistant Examiner*—Robert R. Raevis
*Attorney, Agent, or Firm*—William R. Sharp

[57] ABSTRACT

An apparatus and method for calibrating a flow meter are provided which utilize a tank for maintaining the apparatus liquid full. The tank has a freely movable barrier therein which divides the interior of the tank into a first section and a second section wherein the first section is in communication with a system which comprises at least one prover and a meter in series. A biasing means, such as a compressed gas in the second section of the tank, is also provided for urging the barrier toward the first section of the tank. Employing the tank according to the invention maintains a liquid filled system.

16 Claims, 1 Drawing Figure

APPARATUS AND METHOD FOR CALIBRATING A FLOW METER

BACKGROUND OF THE INVENTION

This invention relates to an apparatus and method for calibrating a flow meter utilizing a prover.

In the use of flow meters to measure the quantity of fluid flowing in a conduit, it is frequently desirable to determine the accuracy of the meter in detecting the volume of fluid flowing through the meter. A process for determining meter accuracy is commonly referred to as meter calibration. A meter calibration process typically utilizes a device known as a prover.

As used herein, the term prover refers to any of a number of devices which include a conduit containing a solid member, such as a ball or piston, movably positioned therein, and two detection points along the conduit having suitable means, such as actuating switches, associated therewith for detecting the solid member as it moves past each detection point.

In calibrating a volumetric flow meter, a stream of fluid is passed simultaneously through a prover and the flow meter. Liquid flowing through the prover conduit moves the solid member from one detection point to the other detection point. The output of the flow meter is monitored in the time interval between actuating times for the detection points. This output is correlated with the known volume of the prover conduit between the detection points to yield an appropriate calibration factor.

Some particular problems arise when calibrating a liquid flow meter. More particularly, it is desirable that such a liquid calibration system be liquid-full at all times during the calibration test in view of the fact that a mixed phase of vapor and liquid causes the meter and prover to give erratic and unpredictable readings. Most prior calibration systems have utilized a large liquid supply tank maintained at atmospheric pressure for helping maintain a single liquid phase condition in the calibration system, and an associated pump for pumping liquid from the tank for subsequent flow through the meter and prover. Typically, the suction side of the pump is connected to the supply tank so as to be maintained at atmospheric pressure, and the discharge side of the pump discharges to the meter and prover which are maintained at a higher pressure. The pressure differential across the pump is usually substantial (i.e., 200 psi or more). Since the power requirements for the pump are based on the pressure differential across the pump, the large pressure differential usually requires a pump with an undesirably high horsepower. Generally, an increase in pump power means a resultant increase in heat introduced to the system which contributes to temperature instability of the system and consequent unreliable calibration results. Furthermore, continual contact of ambient air with the liquid in the supply tank causes aeration of the liquid and a two-phase condition which leads to erroneous results as discussed above.

SUMMARY OF THE INVENTION

It is, therefore, an object of the invention to provide an apparatus and method for calibrating a flow meter which minimizes power requirements, and wherein the apparatus is maintained liquid-full during operation.

It is also an object of the invention to provide a flow meter calibration apparatus and method in which aeration of liquid is minimized.

The above objects are realized in an apparatus which comprises: a prover having an inlet and outlet; a flow meter having an inlet and outlet; first means for defining a flow path between the prover outlet and the meter inlet; second means for defining a flow path between the meter outlet and the prover inlet; and a tank having a barrier positioned therein to divide the interior of the tank into a first section and a second section, wherein the first section is in direct fluid communication with the second flow path defining means. The barrier is also freely movable within the tank so that volumes of the respective first and second sections change in response to movement of the barrier. The apparatus further comprises a biasing means for exerting a force upon the barrier in a direction generally toward the first section. The biasing means can take the form of a compressed gas in the second section of the tank. The gas can be supplied from a pressurized gas source having associated therewith a means for providing selective fluid communication between the gas source and the second section of the tank.

According to another aspect of the invention, there is provided a method which comprises: flowing a stream of liquid through a closed loop system comprising a prover, a flow meter, a first means for defining a flow path between the prover outlet and the meter inlet, and a second means for defining a flow path between the meter outlet and prover inlet; providing direct fluid communication between an interior section of a tank and the second flow path defining means so as to allow the interior section to fill with liquid, wherein the section is defined by the interior surface of the tank and a movable barrier positioned therein; and controlling the position of the barrier in response to pressure exerted thereupon by the liquid so as to maintain the system liquid filled.

The apparatus and method of the invention require less power for operation than prior calibration systems, thus providing improved temperature stability and associated reliable calibration results. In addition, the invention substantially avoids aeration of liquid in the system to assist in avoiding a two phase condition.

DETAILED DESCRIPTION OF THE DRAWINGS

Figure 1:
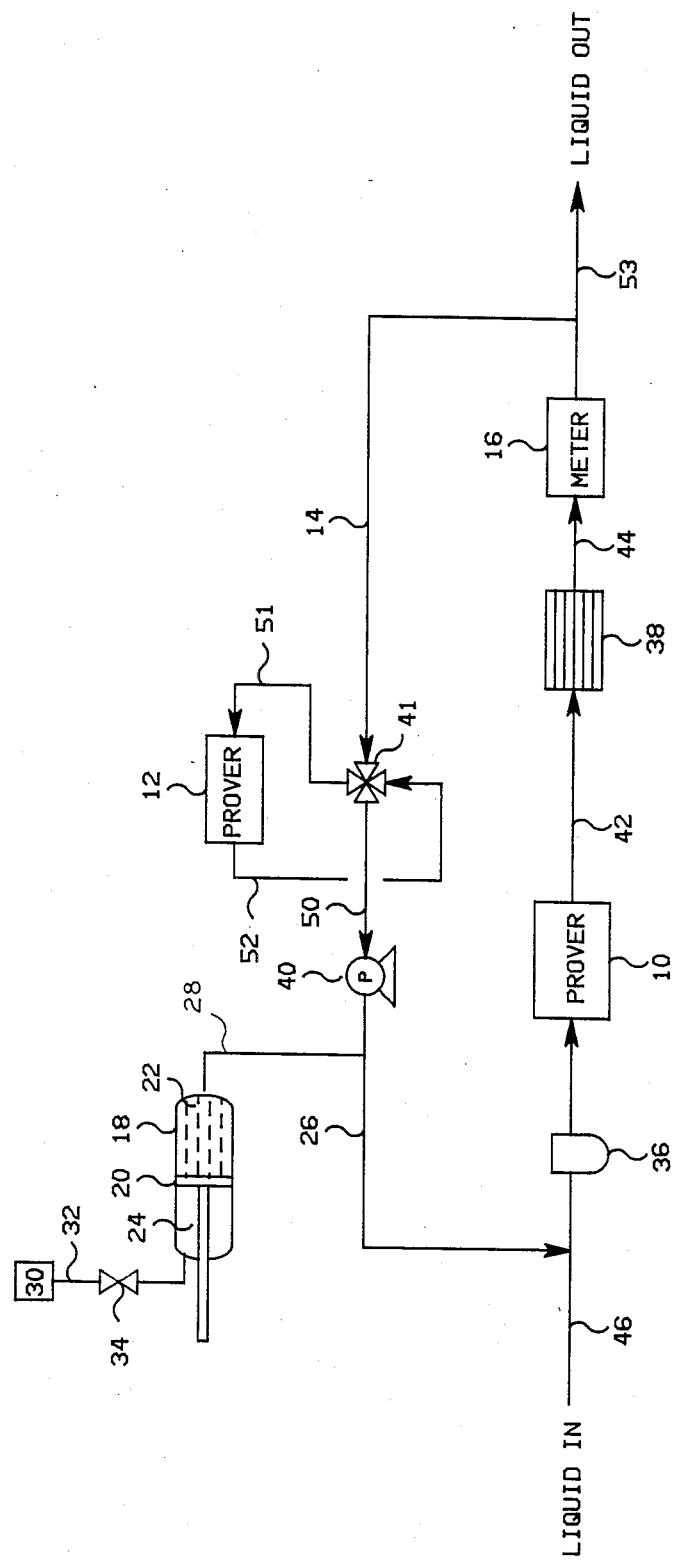
FIG. 1 is a schematic representation of one embodiment of an apparatus according to the invention.

A preferred embodiment of the invention will now be described with reference to FIG. 1. The illustrated embodiment is applicable to the calibration of any type of liquid flow meter, and can be used with any liquid compatible with the flow meter. The apparatus of FIG. 1 includes various elements, hereinafter described, effective to accomplish calibration of a flow meter, and various lines or conduits which, together with certain elements of the apparatus, define flow paths between various other elements.

Referring to FIG. 1, the apparatus includes a prover 10 which is preferably a ballistic piston type prover. A prover of this type is commercially available from Brooks Instrument Division of Emerson Electric Company of Statesboro, Ga. An additional prover 12, which can be a conventional ball prover, is associated with line 14 in a manner hereinafter discussed so that its inlet is in communication with the outlet of meter 16 and its outlet is in communication with the inlet of prover 10. For most applications, meter 16 is a volumetric type meter for measuring the volume of liquid flowing therethrough. Meter 16 can, for example, be of the type which produces a series of electrical impulses, each impulse representing a certain volume of liquid. Flow volume as measured by the meter is determined by counting the number of impulses produced as liquid passes through the meter. Such counting can be readily performed by electronic counters which display a number representing the total number of impulses received from the meter.

The apparatus shown in FIG. 1 also includes a tank 18 which has a piston 20 slideably mounted therein so as to divide the interior of the tank into two sections, namely sections 22 and 24. Piston 20 is a conventional piston comprising a cylindrical portion in sealing engagement with the interior surface of tank 18 and a shaft extending from one side of the cylindrical portion and through one end of tank 18. The extent to which the shaft extends from tank 18 can be visually monitored by an operator to determine the position of the piston within tank 18. Piston 20 is freely movable within the tank so that the volumes of the respective sections 22 and 24 change in response to movement of the piston. It should be understood that a suitably movable barrier other than the illustrated piston may be used. One example is a flexible diaphragm connected at its edges to the interior surface of tank 18. Such a diaphragm responds effectively and quickly to pressure changes within the tank. However, a diaphragm will not always be capable of accommodating the large changes in volume of interior sections 22 and 24 which can be expected in the illustrated system. Therefore, the illustrated piston is generally preferred even though some energy losses can be expected due to friction between the piston and the tank. One other alternative arrangement could involve a small diaphragm mounted on the side of piston 20 facing section 22. The diaphragm in such an arrangement would assist in evening out pressure pulsations in the system due to its quick response to pressure changes, and the piston would accommodate the large section volume changes to be expected in the illustrated system.

As shown, section 22 is in direct fluid communication with line 26 by means of a conduit or line 28 which extends between section 22 and line 26. Section 24 is adapted to receive a compressed gas from gas source 30 via line 32. Valve 34 is positioned along line 32 so as to provide selective fluid communication between source 30 and section 24 of tank 18. Filling of section 24 with the compressed gas serves to exert a force upon piston 20 in a direction generally toward section 22. Thus compressed gas within section 24 serves as a biasing means with respect to piston 20. It should be apparent that other biasing means may be used, such as a spring.

The apparatus of FIG. 1 further comprises a strainer 36 for removing various foreign materials from the liquid stream; straightening vanes 38 which function to straighten the flow of liquid into the meter so as to avoid an undesirable flow profile; a pump 40 which is adapted to pump a continuous flow of liquid through the system; and a four-way diverter valve 41 for directing liquid flow as will become more apparent below. Of course, vent valves (not shown) can be provided to selectively purge the system of gases.

The illustrated apparatus is a closed loop system whose various important elements are connected as follows. A flow path defined by lines 42 and 44, and also vanes 38, extends between the outlet of prover 10 and the inlet of meter 16. Another flow path defined by various lines and other elements of the apparatus extends between the outlet of meter 16 and the inlet of prover 10.

The illustrated apparatus can be operated as follows. A flow of a liquid, such as crude oil, is first established in the system with the aid of a valve (not shown) along line 46. The liquid can be supplied from a suitable source such as a tank (not shown) which can be connected to line 46. Pump 40 is actuated so as to pump a continuous stream of liquid through the closed loop system. Liquid flows through strainer 36, prover 10 and into line 42. The liquid then flows through line 42, vanes 38, meter 16 and into diverter valve 41 via line 14. This stream is directed by diverter valve 41 into the inlet of prover 12 via line 51. Liquid then flows from the outlet of prover 12, through line 52 and back into diverter valve 41 and into line 50. The closed loop system can be drained via line 53 using a valve along line 53.

Valve 34 is opened to allow gas from source 30 to enter section 24 of tank 18. The presently preferred gas is nitrogen due to its ready availability and due to the fact that it is not flammable. Flow of gas into section 24 is allowed to continue until a predetermined pressure is reached. This pressure is dependent upon the liquid employed, and is preferably above the vapor pressure associated with that liquid. For example, for diesel fuel the initial pressure within section 24 would be set at about 50 pounds psi. After the desired pressure is reached, valve 34 is closed. In addition, piston 20 is preferably positioned within tank 18 to allow for any expected changes in position due to temperature variations and consequent expansion and contraction of the liquid. It should also be noted that the pressure of liquid in section 22 and in the remainder of the system is necessarily equivalent to that pressure in section 24.

Fluid communication between section 22 and line 26 is provided during flow of liquid through the closed loop system. The position of piston 20 tends to be automatically controlled in response to pressure exerted upon the piston by liquid in section 22 so as to maintain the system liquid filled. The combination of the compressed gas in section 24 and slideable piston 20 also serves to maintain a substantially constant pressure within the system so as to avoid exceeding pressure limitations of various apparatus components, and also tends to even out high frequency pressure pulsations which can adversely affect performance of flow meter 16.

After a flow of liquid is established through the system and tank 18 is appropriately pressurized as discussed above, calibration of meter 16 is accomplished as follows. It will be assumed for the sake of discussion that meter 16 is of the type which produces electrical impulses in response to volume of liquid flowing therethrough. The piston or other movable member in prover 10 is allowed to be moved by the liquid flow between two detection points within the prover. Counting of impulses from meter 16 is initiated at the same time that the movable member in prover 10 is detected at the first detection point. This is typically done automatically by, for example, electrically actuating an electronic counter (not shown) by means of a switch at the first detection point in prover 10. Upon detection of the movable member at the second detection point, counting of impulses from meter 16 is stopped. The number of impulses between actuating times for the two detection points is divided by the known volume of the prover between detection points to yield a calibration factor. The calibration factor is expressed as number of impulses per unit volume. This calibration factor can be applied in the future operation of the meter to obtain an accurate reading of the volume of liquid flowing through the meter.

According to the illustrated embodiment, the correct volume of prover 12 between detection points therein can be determined using the calibration factor calculated above. This correct volume can be determined by allowing a movable member such as a ball within prover 12 to be passed between detection points therein and monitoring the number of impulses produced by meter 16 in the time interval between detection points, and then calculating the volume of prover 12 between its detection points using the previously determined calibration factor. For example, if 100 impulses are counted and the calibration factor is 20 impulses per unit volume, then the correct volume corresponding to prover 12 would be five unit volumes.

After the procedure described above is completed, the movable members in the provers can be returned to their initial positions by conventional means to be ready for another test.

A determination of the volume corresponding to prover 12 by utilizing prover 10 is desirable in the situation where prover 12 is used frequently in the field and is subject to corrosion, various wall deposits and deformation of the prover conduit which can change the volume associated with prover 12. Prover 10, used only infrequently to test the volume of prover 12, is assumed to have an accurate known volume to enable accurate calibration of meter 16 and subsequent accurate redetermination of the volume of prover 12. The volume of prover 12 as determined above can then be used in routine calibration operations. Periodic testing of the volume of prover 12 can be carried out similarly.

Of course, diverter valve 41 can be set to pass a straight flow of liquid therethrough so as to bypass prover 12 when only calibration of meter 16 is desired using prover 10.

Several advantages of the present invention should be apparent at this point. First, use of tank 18 and its associated piston and compressed gas functions to effectively maintain the system liquid filled so as to avoid a two-phase condition which can lead to inaccurate calibration results. Use of tank 18 is particularly advantageous, however, in that there is a much smaller pressure differential across pump 40 than is possible with the previously noted systems utilizing an atmospheric supply tank. The present invention can successfully operate with a pressure differential as little as one-tenth that of the pressure differential associated with the prior systems. As previously noted, such a small pressure differential permits the use of a smaller horsepower pump, thus saving energy and, more importantly, enhancing the temperature stability and accuracy of the system. Furthermore, since compressed gas in section 24 of tank 18 is separated from the liquid in section 22 by piston 20, aeration of liquid in section 22 is avoided in contrast to atmospheric tanks. Yet another advantage of the present invention lies in the position of tank 18 with respect to the provers and the meter. Tank 18 is positioned out of the flow path between the provers and meter. If tank 18 were positioned in such a flow path, such as along line 42 or 44, temperature changes during a calibration test could cause the volume of liquid in the tank to change so that the meter would receive a different volume of liquid than that which flowed through prover 10. This would destroy the accuracy of the calibration due to the fact that it is essential in such a calibration that the same volume of liquid flow through the prover and meter during the test. The same erroneous result could arise if the tank were positioned along line 14.

Obviously, many modifications and variations of the present invention are possible in light of the above teachings. It is therefore to be understood that within the scope of the appended claims the invention may be practiced otherwise than as specifically described.

That which is claimed is:

1. An apparatus comprising:
   a first prover having an inlet and an outlet;
   a flow meter having an inlet and an outlet;
   first means for defining a flow path between said meter inlet and said prover outlet;
   second means for defining a flow path between said meter outlet and said prover inlet;
   a tank having a barrier positioned therein so as to divide the interior of said tank into a first section and a second section, said first section being in direct fluid communication with said second flow path defining means, wherein said barrier is freely movable within said tank so that the volumes of said respective first and second sections change in response to movement of said barrier; and
   biasing means for exerting a force upon said barrier in a direction generally toward said first section.

2. An apparatus as recited in claim 1, wherein said barrier comprises a piston slideably mounted within said tank.

3. An apparatus as recited in claim 2, further comprising pump means adapted to pump a continuous flow of liquid through said apparatus.

4. An apparatus as recited in claim 3, further comprising a second prover, associated with said second flow path defining means, which has an inlet in communication with said meter outlet and an outlet in communication with said first prover inlet.

5. An apparatus as recited in claim 4, said apparatus including a conduit means which extends between said first section of said tank and said second flow path defining means so as to provide fluid communication between said first section and said second flow path defining means.

6. An apparatus comprising:
   a first prover having an inlet and an outlet;
   a flow meter having an inlet and an outlet;
   first means for defining a flow path between said prover outlet and said meter inlet;
   second means for defining a flow path between said meter outlet and said prover inlet;
   a tank having a barrier positioned therein so as to divide the interior of said tank into a first section and a second section, said first section being in direct fluid communication with said second flow path defining means, wherein said barrier is freely movable within said tank so that the volumes of said respective first and second sections change in response to movement of said barrier; and
   a source of pressurized gas having an outlet; and a means for providing selective fluid communication between said gas source outlet and said second section of said tank.

7. An apparatus as recited in claim 6, wherein said barrier comprises a piston slideably mounted within said tank.

8. An apparatus as recited in claim 7, further comprising pump means adapted to pump a continuous flow of liquid through said apparatus.

9. An apparatus as recited in claim 8, further comprising a second prover, associated with said second flow path defining means, which has an inlet in communication with said meter outlet and an outlet in communication with said first prover inlet.

10. A method comprising:
(a) flowing a stream of liquid through a closed loop system comprising a prover having an inlet and outlet and a flow meter having an inlet and outlet, said system further comprising a first means for defining a flow path between said prover outlet and said meter inlet and a second means for defining a flow path between said meter outlet and said prover inlet;
(b) providing direct fluid communication between a first interior section of a tank and said second flow path defining means during step (a) so as to allow said section to fill with liquid, wherein said section is defined by the interior surface of said tank and a movable barrier positioned therein; and
(c) controlling the position of said barrier during step (a) in response to pressure exerted upon said barrier by the liquid so as to maintain said system liquid filled.

11. A method as recited in claim 10, wherein said barrier divides the interior of said tank into said first section and also a second section, said second section containing a compressed gas therein.

12. A method as recited in claim 11, wherein said gas is nitrogen.

13. A method as recited in claim 12, wherein the pressure associated with said compressed gas is generally above the vapor pressure of said liquid.

14. A method as recited in claim 13, wherein said liquid is crude oil.

15. A method as recited in claim 11, wherein said system further comprises a second prover associated with second flow path defining means, said stream of liquid being additionally passed through said second prover.

16. A method as recited in claim 15, further comprising the following steps which are carried out after step (c): determining the calibration factor of said flow meter; and determining the actual volume of said second prover utilizing said calibration factor.

* * * * *